Dec. 21, 1926.
K. J. E. HESSELMAN
1,611,526
INTERNAL COMBUSTION ENGINE
Filed June 26, 1926
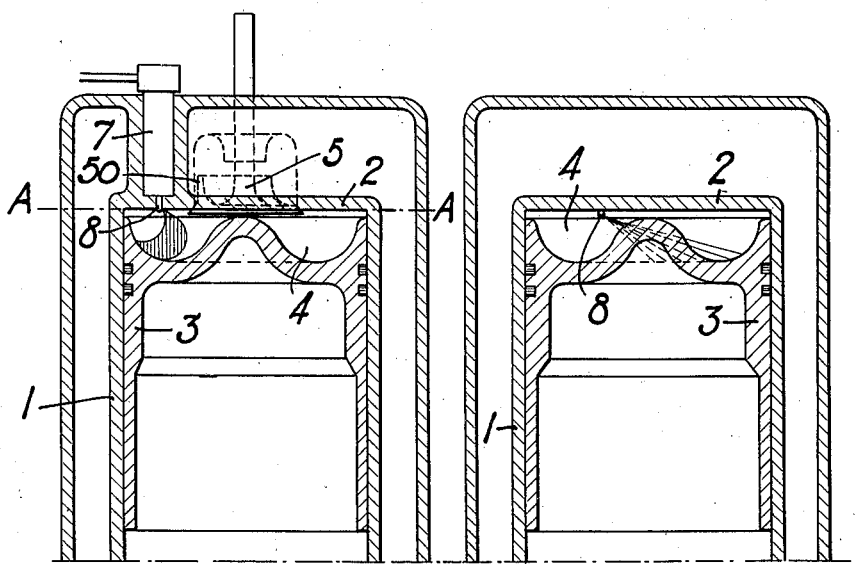
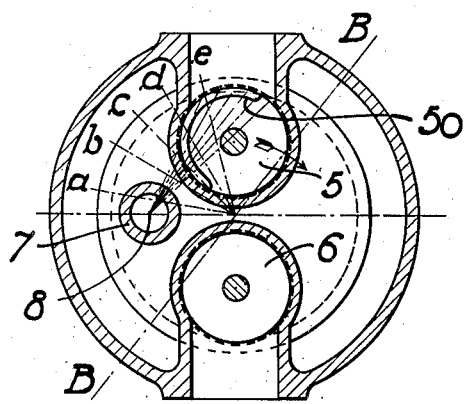
Inventor,
Knut Jonas Elias Hesselman,
By Henry Noth
Atty.

Patented Dec. 21, 1926.

1,611,526

UNITED STATES PATENT OFFICE.

KNUT JONAS ELIAS HESSELMAN, OF SALTSJO-STORANGEN, SWEDEN.

INTERNAL-COMBUSTION ENGINE.

Application filed June 26, 1926, Serial No. 118,804, and in Sweden July 27, 1925.

This invention relates to internal combustion engines of the type in which the combustion chamber is situated between the piston head and the cylinder cover and is, substantially, of the same shape as a body of revolution.

Heretofore, the most suitable way to supply the fuel to such engines has been considered to be central introduction into the combustion chamber, inasmuch as this method of introduction permits uniform distribution of the fuel into the air mass.

In an internal combustion engine of small size and, generally, in high speed four stroke cycle engines, however, it is frequently impracticable to place a fuel valve or nozzle between the air and exhaust valves inserted in the cylinder cover, especially, as it is desired to make said valves as large as possible in order that the gas velocities may be moderate.

Many attempts have been made to avoid the eccentric placing of the fuel valve as required by the air and exhaust valves. Thus, for instance, it has been proposed to arrange the air and exhaust valves in an inclined position in order to obtain sufficient space for the mounting of the fuel valve. In such a design the valve motion, however, will be rather complicated and the engine expensive in manufacture. It has also been proposed to place the fuel valves horizontally in the cylinder wall and inject the fuel as a film below the under side of the cylinder cover parallel thereto. In such a design which is particularly unsuitable for engines having separate cylinder linings recesses must be formed in the piston which are, of course, disadvantageous as regards the strength of the piston and the capability of the piston to retain its shape when heated as a result of the combustion. Moreover, there will always be a tendency for oil accidentally dropping from the valve to reach the cylinder wall where it may act detrimentally by spoiling the lubrication. Also from the mere combustion point of view the arrangement under consideration is not ideal due to the fact that it is almost impossible to prevent the flame, especially at higher loads, from flaring up towards the cold lower side of the cylinder cover. Heretofore, as a result, it was not possible to obtain a high effect from such a machine without using two diametrically opposite fuel valves. In practice, of course, great difficulties are experienced in distributing in a proper way the small amounts of fuel to said two inlet points. In particular, such difficulties would be especially high in small high speed engines.

The present invention has for its object to provide simple means whereby the above said difficulties in placing the fuel valve are overcome at the same time enabling a distribution of the fuel as uniformly as may be obtained when using a centrally positioned fuel valve.

The invention is characterized, chiefly, by the combination with means to cause the air to rotate within the combustion chamber, of fuel injecting means situated at a point between the center of the cylinder and the inner wall thereof so constructed and arranged as to inject the fuel substantially in a direction forming an angle both with a plane at right angle to the cylinder axis and with the plane that may be laid through said axis and said means.

This construction presents the advantage from manufacturing point of view that the boring adapted to receive the injecting valve will lie in the cylinder cover parallel to the borings adapted to receive the other valves.

A fuel nozzle may, preferably, be used having a single aperture. If desired, a plurality of such nozzles may be used in connection with one and the same cylinder.

In the drawing, one embodiment of the invention is illustrated. Fig. 1 is a vertical section of the upper portion of an engine constructed in accordance with this invention. Fig. 2 is a horizontal section taken on the line A—A in Fig. 1. Fig. 3 is a vertical section taken on the line B—B in Fig. 2.

In the drawing, for the sake of simplicity, the cylinder 1 of the engine is shown as made integral with the cylinder cover. The piston head 3 is so shaped as to form between it and the cylinder cover an annular combustion chamber 4 of a shape corresponding to that of a body of revolution, as, for instance, a torus. Mounted in the cylinder cover are the air supply valve 5 and the exhaust valve 6 in well known way. The air inlet valve 5 is formed with a shield, at 50, to cause the air entering the cylinder to rotate therein around the cylinder axis as indicated by the arrow in Fig. 2. It is assumed that the engine is of high speed type and, as a result, said valves are of large dimensions so that there will be left no space between them sufficient to receive a fuel valve. Said valve must, therefore, be placed eccentrically, preferably in such a way that sufficient space for cooling purposes will be available around the inlet and exhaust valves.

In the drawing the fuel valve is indicated at 7 and the associated nozzle at 8. Said nozzle is, preferably, formed with a single aperture but may, if desired, have two or more apertures. Said aperture or apertures is, or are, so directed that the fuel jet will form an angle both with a plane at right angle to the cylinder axis and with the plane that may be laid through said axis and said nozzle. As seen in plane, the fuel is injected in the direction of the rotary air.

By a suitable choice of said angles as well as of the speed of rotation of the air supplied through the valve 5, that is, so that each radial section of the air will pass the fuel one time only, it has proved possible to obtain a complete and smokeless combustion when using equal mean pressures as in engines having central fuel introduction through a plurality of apertures. This is true particularly in case of small engines.

In the drawing the direction of the fuel jet is so chosen that with the position of the fuel nozzle and shape of the combustion chamber as shown in the drawing the greatest length possible of the fuel string will be obtained.

In order to make the good results above referred to more clear a number of radial sections of the fuel jet may be assumed to be taken along the lines $a, b, c, d, e$, Fig. 2. Assuming, these sections are projected on the plane of the drawing, they will together form the shaded surface. By suitable choice of the angles of the fuel jet the result may be obtained that the greater part of the cross section area of the combustion chamber will be covered, that is, that all of the air passing through the fuel jet, will be saturated with fuel. In practice, the fuel will be lifted to some extent by the air current so that the said covering will be still more complete than shown in the drawing. Yet, however, a certain amount of air should always be present above the fuel to prevent it from directly striking the comparatively cold lower side of the cylinder cover. This result will be obtained already at a very moderate spreading of the fuel which involves a positive advantage because of the fact that a highly spread fuel jet will be less stable and may easily change its direction or be easily thrown towards the cylinder cover.

The annular form of the combustion chamber shown in the drawing is not absolutely necessary but is of great value in the type of engine under consideration. It has hitherto not been possible by means of a single fuel jet from a concentrically positioned fuel valve to obtain satisfactory results. As it must be considered to be a very great advantage to enable the use in small enines of nozzles having but one aperture the arrangement may be of practical importance also at such engines in which there are no valves in the cylinder cover which prevent a central placing of the fuel valves, as, for instance, in small two stroke cycle engines having exhaust ports in the cylinder wall controlled by the piston and in which there are no valves in the cylinder cover.

What I claim is:

1. In an internal combustion engine of the type having a combustion chamber substantially in the shape of a body a. revolution situated between the piston head and the cylinder cover, the provision of means to introduce combustion air into said chamber in such a way as to cause it to perform a rotary motion therein around the cylinder axis, and fuel injecting means provided in the cylinder cover at a point thereof situated between the axis of the cylinder and the inner wall thereof, said injecting means being, furthermore, so positioned as to introduce the fuel substantially in a direction forming an angle both with a plane at right angle to the cylinder axis and with the plane that may be laid through said axis and said means.

2. In an internal combustion engine, a cylinder cover and a piston head so shaped as to form a substantially annular combustion chamber therebetween in the innermost position of the piston, means in said cylinder cover to introduce combustion air into said chamber in such a way as to cause it to perform a rotary motion therein around the cylinder axis, and a fuel injecting nozzle provided in the cylinder cover at a point thereof situated between the axis of the cylinder and the inner wall thereof, said injecting nozzle being furthermore, so positioned as to introduce the fuel substantially in a direction forming an angle both with a plane at right angle to the cylinder axis and with a plane through said axis and said nozzle.

3. In an internal combustion engine of the type having a combustion chamber in the shape of a body of revolution situated between the piston head and the cylinder cover, the provision of means to introduce combustion air into said chamber in such a way as to cause it to perform a rotary motion therein around the cylinder axis, and a fuel injecting nozzle provided in the cylinder cover at a point thereof situated between the axis of the cylinder and the inner wall thereof, said injecting nozzle being, furthermore, so positioned as to introduce the fuel substantially in the direction of rotation of the air and at the same time in a direction forming an angle with a plane at right angle to the cylinder axis.

In testimony whereof I have signed my name.

KNUT JONAS ELIAS HESSELMAN.